US011151447B1

(12) United States Patent
Chen et al.

(10) Patent No.: US 11,151,447 B1
(45) Date of Patent: Oct. 19, 2021

(54) NETWORK TRAINING PROCESS FOR HARDWARE DEFINITION

(71) Applicant: Zoox, Inc., Menlo Park, CA (US)

(72) Inventors: Robert Chen, San Francisco, CA (US); Jesse Sol Levinson, Redwood City, CA (US); Ryan McMichael, Mountain View, CA (US); James William Vaisey Philbin, Palo Alto, CA (US); Maxwell Yaron, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 1091 days.

(21) Appl. No.: 15/457,838

(22) Filed: Mar. 13, 2017

(51) Int. Cl.
*G06N 3/08* (2006.01)
*G06F 16/21* (2019.01)

(52) U.S. Cl.
CPC ............ *G06N 3/08* (2013.01); *G06F 16/211* (2019.01)

(58) Field of Classification Search
CPC ................................ G06N 3/08; G06F 16/211
See application file for complete search history.

(56) References Cited

U.S. PATENT DOCUMENTS

| | | | | |
|---|---|---|---|---|
| 9,628,170 | B1* | 4/2017 | Rosenband | H04B 7/26 |
| 9,871,959 | B1* | 1/2018 | Hlatky | H04N 5/23206 |
| 10,015,462 | B1* | 7/2018 | Quach | G07C 5/085 |
| 10,332,245 | B1* | 6/2019 | Price | G06T 7/0002 |
| 2015/0234045 | A1* | 8/2015 | Rosenblum | G01S 13/931 |
| | | | | 342/71 |
| 2016/0140320 | A1* | 5/2016 | Moturu | G06F 19/3481 |
| | | | | 434/236 |
| 2016/0266256 | A1* | 9/2016 | Allen | G01S 17/89 |
| 2016/0373645 | A1* | 12/2016 | Lin | H04N 5/23219 |
| 2017/0008521 | A1* | 1/2017 | Braunstein | G01C 21/32 |
| 2017/0066459 | A1* | 3/2017 | Singh | B61L 23/044 |
| 2017/0115387 | A1* | 4/2017 | Luders | G01S 7/4026 |
| 2017/0154426 | A1* | 6/2017 | Cheng | G06K 9/6215 |
| 2017/0206426 | A1* | 7/2017 | Schrier | G06K 9/6273 |
| 2017/0307735 | A1* | 10/2017 | Rohani | G01S 7/417 |

(Continued)

OTHER PUBLICATIONS

Ganapathy, "Handwritten Character Recognition Using Multiscale Neural Network Training Technique", 2008, vol. 3, 638-643 (Year: 2008).*

(Continued)

*Primary Examiner* — Kamran Afshar
*Assistant Examiner* — Imad Kassim
(74) *Attorney, Agent, or Firm* — Lee & Hayes, P.C.

(57) ABSTRACT

This disclosure describes methods, apparatuses, and systems for network training and testing for evaluating hardware characteristics and for hardware selection. For example, a sensor can capture a dataset, which may be transformed into a plurality of modified datasets to simulate changes to hardware. Each of the plurality of modified datasets may be used to individually train an untrained neural network, thereby producing a plurality of trained neural networks. In order to evaluate the trained neural networks, each neural network can be used to ingest an evaluation dataset to perform a variety of tasks, such as identifying various objects within the dataset. A performance of each neural network can be determined and compared. A performance curve can be determined for each characteristic under review, facilitating a selection of one or more hardware components and/or configurations.

22 Claims, 9 Drawing Sheets

(56) References Cited

U.S. PATENT DOCUMENTS

| | | | | |
|---|---|---|---|---|
| 2017/0330319 A1* | 11/2017 | Xu | ............................ | G06T 7/73 |
| 2018/0075643 A1* | 3/2018 | Sequeira | .............. | G01C 21/206 |
| 2018/0077538 A1* | 3/2018 | Matus | ................... | H04W 4/023 |
| 2018/0089843 A1* | 3/2018 | Miecznik | .................. | G06T 7/32 |
| 2018/0217233 A1* | 8/2018 | Lee | ....................... | G01S 7/4802 |
| 2018/0244129 A1* | 8/2018 | Whitens | ................. | G01J 5/026 |
| 2018/0299554 A1* | 10/2018 | Van Dyck | ............... | G01S 17/10 |

OTHER PUBLICATIONS

Marco Venturelli, "From Depth Data to Head Pose Estimation: a Siamese approach", University of Modena and Reggio Emilia, DIEF, Mar. 10, 2017 (Year: 2017).*

* cited by examiner

NETWORK TRAINING PROCESS FOR HARDWARE DEFINITION

BACKGROUND

Autonomous vehicles may use a variety of sensor types, including cameras, LIDAR, Radar, GPS, etc., to determine a vehicle location within an environment and to plan a vehicle trajectory within the environment. For each sensor type, there exists a variety of available devices having different characteristics, such as resolution, color filter array, cost, etc. from which designers and engineers can choose when designing a vehicle. Sensors can be selected on a basis of technical requirements and cost requirements. However, the number of possible individual sensors and combinations of sensors can be large, and it can be a daunting task to select sensors for inclusion within the autonomous vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
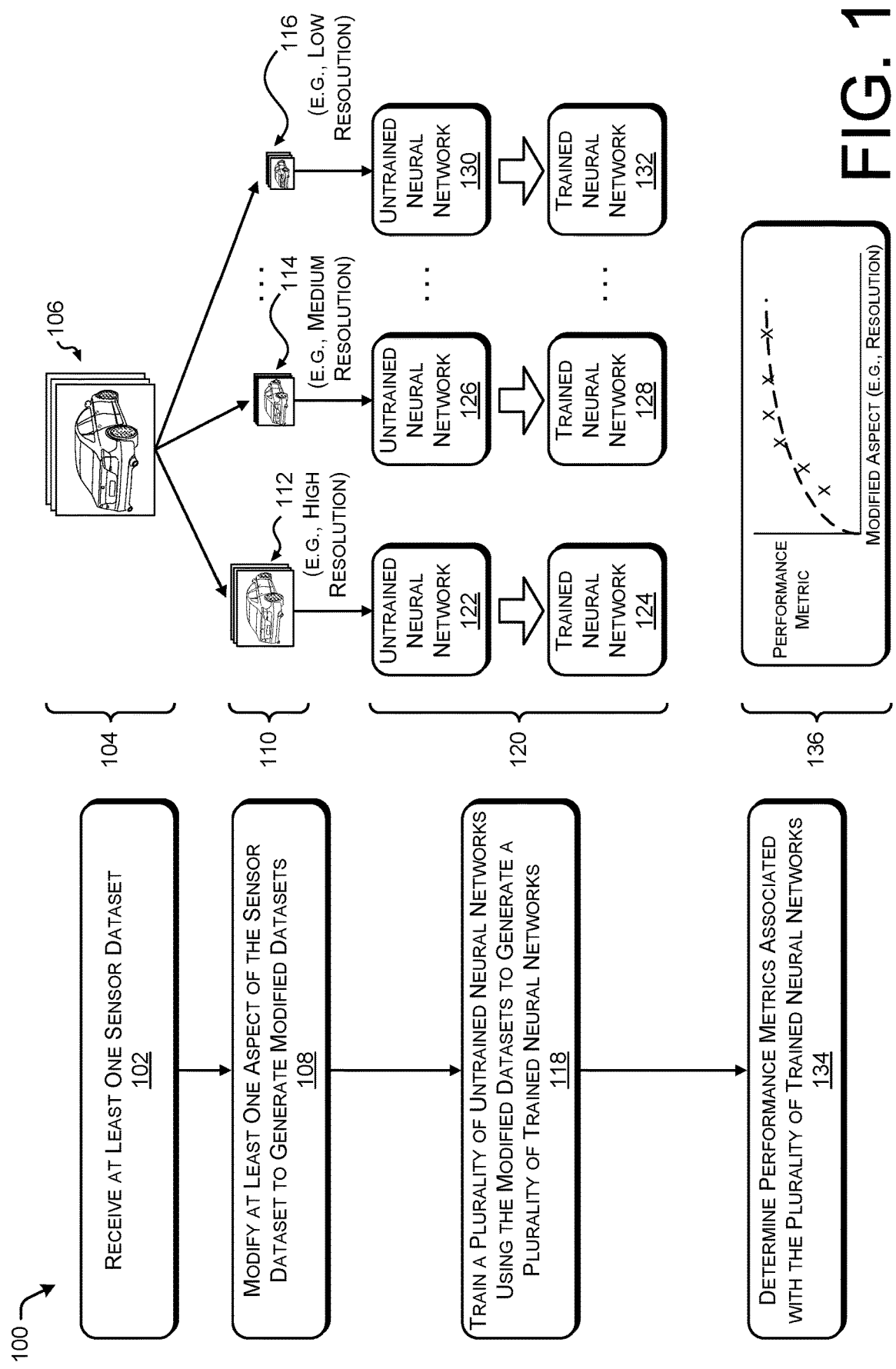
FIG. 1 illustrates a pictorial flow diagram of a process for implementing network training for evaluating hardware characteristics for sensors.

This disclosure describes methods, apparatuses, and systems for network training and testing for evaluating hardware characteristics and for selecting hardware. For example, the methods described herein can be used to evaluate how changing characteristics of a single sensor or groups of sensors may affect a performance outcome of the system. The methods described herein may operate on real data obtained from one or more sensors, real data that has been modified to replicate or simulate various hardware configurations or operating conditions, synthetic data that has been generated and annotated by a computer, or any combination therein.

In one example directed to evaluating cameras, sensor data can be obtained from a camera, annotated to identify and/or classify objects within the dataset, and modified to produce a variety of datasets corresponding to various hardware characteristics of different camera sensors. Each dataset can be used to train an untrained neural network, thereby producing a plurality of neural networks, with each neural network trained for a particular modified aspect of data. In order to evaluate the various trained neural networks, each neural network can be used to ingest an evaluation dataset, for example, to identify various objects within the dataset. A performance of each neural network can be determined based on a variety of factors such as a number of false positives (e.g., of object detection/classification), a number of false negatives (e.g., of object detection/classification), processing time, memory requirements, etc. A performance curve can be determined for each characteristic under review, facilitating a selection of one or more hardware components or configurations.

Continuing with the example of evaluating camera sensor capabilities, a high-performance camera can be used to generate a dataset, which can be annotated by hand or annotated automatically to identify objects within the dataset. The annotated dataset can be modified in any number of ways to reflect possible hardware configurations and/or possible operating conditions. For example, possible modifications of the dataset may include altering one or more of resolution, field of view (e.g., horizontal and/or vertical field of view), noise (e.g., Gaussian noise, salt-and-pepper noise, shot noise, quantization noise, anisotropic noise, etc.), dynamic range, arrangement (e.g., location of the sensor on a vehicle), bit depth, frame rate, color filter array (e.g., Bayer filter, RGBE filter, CYYM filter, RGBW Bayer, monochrome, etc.), compression, aberration (e.g., lens aberration), weather (e.g., rain, snow, sleet, hail, night, day, etc.), etc. Upon generating a modified dataset, the modified dataset can be used to train an untrained neural network to generate a trained neural network corresponding to the particular modified dataset. The trained neural network can be evaluated using an evaluation dataset, which may include data that has been altered based on the particular modification, or may include data that has not been altered based on the particular modification. A performance metric can be determined for each trained neural network, which can be utilized in defining requirements of hardware and/or in selecting hardware to be utilized for an autonomous vehicle.

In another example directed to evaluating Radar, sensor data can be obtained from a Radar sensor, annotated to identify and/or classify objects within the dataset, and modified to produce a variety of datasets corresponding to various hardware characteristics of different Radar sensors. For example, possible modifications of the dataset may include, but are not limited to, power, beam width, frequency, number of channels, polarization, resolution, etc. Modifications can include intrinsic characteristics and extrinsic characteristics, as described herein. Additionally, other sensor types may include, but are not limited to, LIDAR, sonar, infrared (IR), ultraviolet (UV), GPS, microphones, etc.

In some instances, the methods described herein can be used to compare performance of two hardware sensors. For example, in the context of cameras, a first camera with a first resolution (or first operating characteristics) can be used to generate a first dataset of images, which can be annotated to identify objects therein. Similarly, a second camera with a second resolution (or second operating characteristics) can be used to generate a second dataset of images, which can be annotated to identify objects therein. Each of the first dataset and the second dataset can be used to train a first neural network and a second neural network, respectively, after which, each neural network can be evaluated using an evaluation dataset to identify objects therein. A performance metric associated with a performance of each neural network can be determined, which can be utilized in selecting between the hardware sensors for incorporation into a system or for further review.

Any number of sensors and any type of sensors may be evaluated in combination to determine a performance of a particular sensor suite. For example, a perception system of an autonomous vehicle may include, at least in part, a camera and a LIDAR sensor on one quadrant of the vehicle. Thus, the methods described herein may be used to evaluate various changes to intrinsic and/or extrinsic aspects of sensor suites, as well as other parameters that may affect system operation. As used herein, intrinsic characteristics of a sensor may include technical capabilities of the sensor that are inherent to the sensor, such as resolution, color filter array, etc. Further, as used herein, extrinsic characteristics of a sensor may include aspects external to the sensor, such as a location of the sensor in an environment. Additional parameters may include post-processing operations such as compression, system delay (e.g., lag), etc. Thus, the methods described herein may be utilized to evaluate performance of various sensors with respect to both intrinsic characteristics (e.g., between a first sensor and a second sensor) and extrinsic characteristics (e.g., a first mounting location of the first sensor and a second mounting location of the first sensor).

In some instances, the network training and evaluation methods described herein may use any combination of real data, modified real data, and synthetic data. For example, a first sensor suite may be evaluated using a camera dataset including a first modification and a LIDAR or Radar dataset including synthetic data, while a second sensor suite may be evaluated using a camera dataset including a second modification and a LIDAR or Radar dataset including synthetic data. Further, synthetic data can be modified or altered to reflect various modifications to intrinsic characteristics and/or extrinsic characteristics, as described herein.

The network training and evaluation systems and methods described herein can improve a functioning of a computing device in a number of ways. In some examples, by applying modifications to a real dataset, an amount of training data can be increased to represent various hardware configurations, which may be more accurate and/or realistic than simply simulating hardware changes or operating conditions. By training an untrained neural network, performance of various hardware characteristics and/or operating conditions can be isolated and evaluated, which can be used to select one or more sensors for use in an autonomous vehicle, for example. Optimized sensors incorporated into an autonomous vehicle can increase an accuracy of position detection and/or trajectory mapping for directing the autonomous vehicle. Further, sensors and/or sensor suites evaluated and optimized as described herein may increase a level of safety for passengers of the vehicle by more accurately identifying obstacles or dangerous situations. Also, sensors and/or sensor suites evaluated and optimized as described herein may reduce an amount of data for subsequent processing by determining minimum hardware requirements to obtain a desired performance level, without generating unnecessary data. These and other improvements to the functioning of the computer are discussed herein.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety systems utilizing machine vision.

FIG. 1 illustrates a pictorial flow diagram of a process 100 for implementing network training for evaluating hardware characteristics of sensors.

At operation 102, the process can include receiving at least one sensor dataset. In an example 104, a dataset 106 can include a series of high resolution images captured using a high performance camera. By way of example, and without limitation, the dataset 106 may include video data at a frame rate of 30 frames per second, with each frame including 100 megapixels of data. In some instances, the operation 102 may include annotating at least a portion of the images in the dataset 106 to identify and/or classify objects of interest, such as vehicles, pedestrians, roadways, road signs, buildings, free space, occupied space, etc. In some instances, the annotating may be performed by hand or automatically by a convolutional neural network (CNN) optimized for identification and classification of objects. In some instances, the annotating may include annotating at least a portion of image of the dataset 106 and propagating the annotations (e.g., labels) to various other frames of the dataset 106. As may be understood in the context of this disclosure, sensor data may include one or more datasets captured using various cameras, LIDAR, Radar, GPS, etc. In some examples, where the dataset 106 is a synthetic dataset, such annotations may be applied programmatically.

At operation 108, the process may include modifying at least one aspect of the sensor dataset to generate modified datasets. For example, modifications may include, but are not limited to changing aspects of the data that may simulate or reflect various hardware configurations or implementations. Taking resolution as an aspect of the dataset 106 to evaluate, for example, the dataset 106 may be modified, perturbed, and/or decimated to produce modified datasets at various resolutions. In an example 110, modified datasets 112, 114, 116 are illustrated, with a resolution of the modified datasets 112, 114, and 116 illustrated as a relative size of the images. For example, the modified dataset 112 may represent a dataset where each frame (e.g., image) includes 20 megapixels, the modified dataset 114 may represent a dataset where each frame includes 10 megapixels, and the modified dataset 116 may represent a dataset where each frame includes 5 megapixels. As may be understood in the context of this disclosure, the number of megapixels described herein are illustrative, and any sizes of images may be used. Further, any number of modified datasets may be generated based on the sensor dataset 106 received in the operation 102, and any number of modifications may be made to the dataset 106. For example, taking frame rate as an aspect of the dataset 106 to evaluate, the dataset 106 may be modified to produce datasets having different frame rates (e.g., 20 frames per second (FPS), 15 FPS, 10 FPS, etc.). Additional modifications are discussed below in connection with FIG. 3, for example. In some examples, such a modification may also include a "null" modification. In other words, the operation 108 may generate a modified dataset which includes no modification to dataset 106.

At operation 118, the process may include training a plurality of neural networks using the modified datasets (e.g., the modified datasets 112, 114, and 116) to generate a plurality of trained neural networks. In an example 120, the modified dataset 112 is input to an untrained neural network 122 to train the untrained neural network 122, thereby generating a trained neural network 124. Similarly, the modified dataset 114 can be input to an untrained neural network 126 to generate a trained neural network 128, and the modified dataset 116 can be input to an untrained neural network 130 to generate a trained neural network 132. In some instances, at least a portion of the modified datasets 112, 114, and 116 can be reserved or set aside (e.g., not used for training in the operation 118) for subsequent use as an evaluation set, discussed below.

As described herein, an exemplary neural network is a biologically inspired algorithm which passes input data through a series of connected layers to produce an output. One example of a neural network may include a convolutional neural network, or CNN. Each layer in a CNN may also comprise another CNN, or may comprise any number of layers. Layers of a CNN may include one or more encoder layers, one or more decoder layers, one or more long short term memory (LSTM) layers, etc. As may be understood in the context of this disclosure, a neural network may utilize machine learning, which may refer to a broad class of such algorithms in which an output is generated based on learned parameters, which will be discussed in detail below. As discussed herein, the various datasets including real data, modified real data, or synthetic data can be utilized to train a neural network to provide some output based upon the parameters learned from ingesting a particular dataset.

In the operation 118, training may include inputting the modified datasets 112, 114, and 116 into each untrained neural network 122, 126, and 130, respectively, with each of the modified dataset 112, 114, and 116 associated with expected output values. That is, the annotations or labels associated with the dataset 106 may be propagated to the modified datasets 112, 114, and 116, such that the modified datasets 112, 114, and 116 may also include the annotations or labels. In some instances, the annotations may include the modification applied to the dataset 106 to generate the modified dataset 112, 114, and 116. That is, if the resolution of the modified dataset 112 has been reduced relative to the dataset 106, annotations associated with the modified dataset 112 may be reduced in resolution as well. These annotations or labels (e.g., expected output values) may generally be referred to as "ground truth." For example, a ground truth may include an identification of specific objects in an image, as well as a semantic classification or label of the object (e.g., identifying and labeling an object as a car or a building).

At operation 134, the process may include determining one or more performance metrics associated each of the plurality of trained neural networks. In some instances, the operation 134 may include receiving or generating an evaluation dataset (e.g., a validation set) that may be used in evaluating the performance of the trained neural networks 124, 128, and 132. For example, an evaluation dataset can include one or more images or set of images to be input to each of the trained neural networks 124, 128, and 132. The evaluation dataset may include objects similar to those in the dataset 106 such that the trained neural networks 124, 128, and 132 may identify the objects or perform an action associated with the function of the trained neural networks 124, 128, and 132. For example, in some instances, the trained neural networks 124, 128, and 132 may have been trained to detect, segment, identify, and/or classify objects within sensor datasets. In some instances, the trained neural networks 124, 128, and 132 may have been trained to generate a trajectory or path for an autonomous vehicle. In some instances, the evaluation data set may be a unique dataset, such that the evaluation dataset does not include any data or frames in common with the datasets used to train the trained neural network 124, 128 and 132.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some instances, the evaluation set used in the operation 134 may include at least a portion of the modified datasets 112, 114, and 116. For example, as discussed above, at least a portion of the modified datasets 112, 114, and 116 can be reserved or set aside (e.g., not used for training in the operation 118) and may instead be utilized as the evaluation set for each respective trained neural network. In some instances, at least a portion of the dataset 106 may be used as the evaluation set. In some instances, an evaluation set may include images not included or represented by the dataset 106 or the modified datasets 112, 114, and 116.

In some instances, evaluating a performance of the trained neural networks 124, 128, and 132 may include determining a number of false positives (e.g., of detection, segmentation, identification, etc.), a number of false negatives, misclassification, mean squared error (MSE), root mean squared error (RMSE), mean absolute error (MAE), processing time, memory requirements, processing requirements, cost, precision, recall, safety, detection speed, etc. In some instances, a performance metric can be based at least in part on a number of true negatives (e.g., negative instances that are predicted negative), true positives (e.g., positive instances that are predicted positive), false negatives (e.g., positive instances that are predicted negative), and/or false positives (e.g., negative instances that are predicted positive).

Example 136 illustrates a graphical representation of a performance curve of a modified aspect (e.g., a resolution of images in the modified datasets 112, 114, and 116) compared to one or more performance metrics, such as a score accounting for precision and recall of a respective one of the trained neural networks 124, 128, and 132. In some instances, the graphical representation may be presented for display and/or may be used at least in part to determine a minimum hardware specification and/or to select a sensor for inclusion in an autonomous vehicle, for example.

Figure 2:
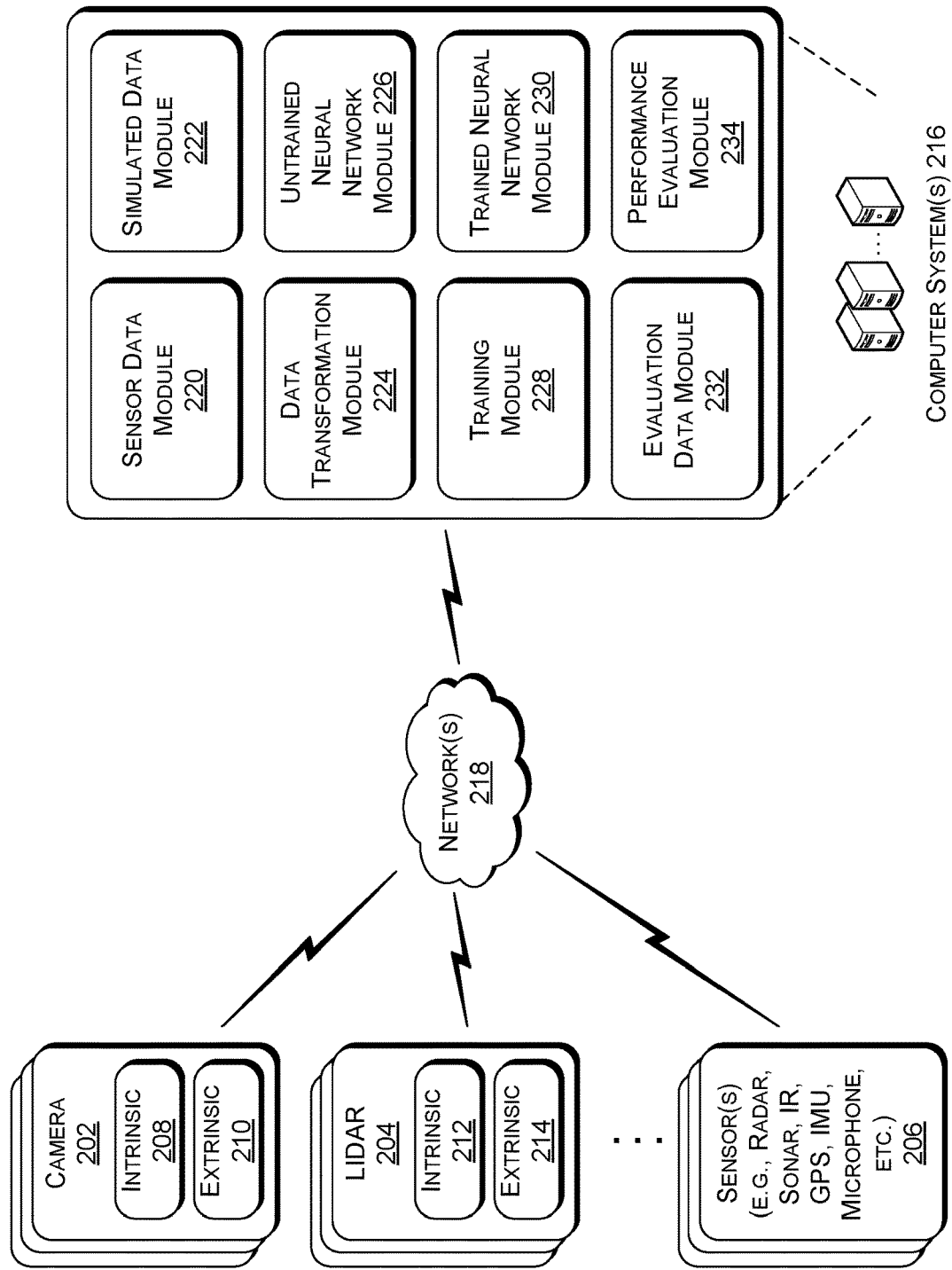
FIG. 2 illustrates an example environment for implementing the network training processes for evaluating hardware characteristics, as described herein.

FIG. 2 illustrates an example architecture 200 for implementing the network training processes for evaluating hardware characteristics, as described herein. For example, the architecture 200 may include one or more cameras 202, one or more LIDAR sensors 204, and one or more additional sensors 206. Further, each instance of the camera 202 may include one or more intrinsic characteristics 208 and one or more extrinsic characteristics 210, while each instances of the LIDAR sensor 204 may include one or more intrinsic characteristics 212 and one or more extrinsic characteristics 214.

The one or more cameras 202, the one or more LIDAR sensors 204, and the one or more additional sensors 206 may provide data to one or more computer system(s) 216 via one or more network(s) 218.

The computer system(s) 216 may include various hardware and/or software to implement aspects of the systems, methods, and apparatuses described herein. For example, the computer system(s) 216 may include a sensor data module 220, a simulated data module 222, a data transformation module 224, an untrained neural network module 226, a training module 228, a trained neural network module 230, an evaluation data module 232, and a performance evaluation module 234.

Turning to the camera 202, the camera 202 may include any color cameras (e.g., RGB), monochrome cameras, infrared (IR) cameras, depth-cameras, ultraviolet (UV) cameras, etc. As noted above, each one of the cameras 202 may include intrinsic characteristics 208 and extrinsic characteristics 210. Intrinsic characteristics 208 may include various intrinsic or inherent features of a camera, such as a camera resolution, frame rate, file type, bit depth, power consumption, cost, etc. Extrinsic characteristics 210 may include various external features associated with the camera 202, such as a mounting location, mounting direction, etc. In some instances, additional aspects may be associated with the camera, such as post-processing (e.g., compression), overall system delay, etc. As may be understood in the context of this disclosure, the camera 202 may capture data and may transmit one or more datasets to the computer system(s) 216 for subsequent processing.

The LIDAR sensor 204 may also include intrinsic characteristics 212 and external characteristics 214. For example, intrinsic characteristics 212 may include, but are not limited to channels, range, accuracy, date rate, field of view, resolution, power consumption, etc. Extrinsic characteristics 214 may include various external features associated with the LIDAR sensor 204, such as a mounting location, mounting direction, etc. As may understood in the context of this disclosure, the LIDAR sensor 204 may capture data and may transmit datasets to the computer system(s) 216 for subsequent processing.

The one or more additional sensor(s) 206 may include any sensors suitable for use in an autonomous vehicle, for example. Various sensors may include, but are not limited to, Radar, sonar, ultrasonic, microphones, inertial measurement unit (IMU), accelerometers, gyroscopes, magnetometers, encoders, temperature sensors, humidity sensors, light sensors, global positioning system (GPS) sensors, or other LIDAR or cameras, such as infrared (IR), etc. As may be understood, the one or more additional sensor(s) 206 may include intrinsic characteristics and extrinsic characteristics. For example, characteristics of a Radar sensor may include, but are not limited to power, beam width, frequency, number of channels, polarization, resolution, installation location, receiver filters, etc.

The sensor data module 220 may include one or more sensor datasets. For example, the sensor data module 220 may receive datasets from the camera 202, the LIDAR sensor 204, and/or from the additional sensors 206 (e.g., a Radar or sonar sensor, as discussed herein), and may store the data in the sensor data module 220. In some instances, the sensor data module 220 may include functionality to annotate the stored data, which may include detecting, identifying, classifying, segmenting, labeling, etc. the data.

The simulated data module 222 may include simulated data that has been generated by a computer simulation algorithm. In some instances, the simulated data stored in the simulated data module 222 may include annotations, as described herein. In some instances, the simulated data module 222 may include any type of simulated data, such as camera data, LIDAR data, Radar data, GPS data, etc. In some instances, the simulated data module 222 can modify the simulated data or may generate the simulated data to reflect various hardware configurations with varying intrinsic characteristics and extrinsic characteristics, and may reflect various operating conditions (e.g., day, night, weather, etc.).

The data transformation module 224 may include functionality to transform aspects of datasets to replicate or simulate changes to intrinsic characteristics and/or extrinsic characteristics of the capturing sensor. In some instances, the data transformation module 224 may receive real data from the sensor data module 220, and in some instances, the data transformation module 224 may receive simulated data from the simulated data module 222. An example of dataset that has been transformed via the data transformation module 224 is shown in the example 110 in FIG. 1, illustrating the modified datasets 112, 114, and 116 having a modified resolution from the captured dataset 106. Additional details of the data transformation module 224 are provided below in connection with FIG. 3.

The untrained neural network module 226 may include one or more untrained neural networks. Untrained neural networks may have weights initialized to default or random values, for example. In some instances, an untrained neural network may have some general pre-training, but may not be optimized for a particular task, such as in a context of an autonomous vehicle. By way of example, the untrained neural network module 226 may store the untrained neural networks 122, 126, and 130 of FIG. 1.

The training module 228 may include functionality to receive real data, modified data, and/or simulated data to train one or more untrained neural networks to generate a plurality of trained neural networks. During training, the training module 228 may adjust weights, filters, connections between layers, and/or parameters for training the individual untrained neural networks to perform a task, such as object identification or trajectory generation. In some instances, the training module 228 may use supervised or unsupervised training.

The trained neural network module 230 may include one or more trained neural networks that have been trained via the training module 228. For example, the trained neural network module 230 can store the trained neural networks 124, 128, and 132 of FIG. 1.

The evaluation data module 232 may include one or more datasets that may be used to evaluate a performance of each trained neural network. As discussed above, in some instances, at least a portion of a dataset (e.g., a real dataset, a dataset having modified real data, or a synthetic dataset) may be reserved or withheld from training the neural networks. These subsets of datasets may include images or aspects with a known ground truth that may be input to the trained neural networks for performance evaluation.

The performance evaluation module 234 may include functionality to input one or more evaluation datasets into each trained neural network and to determine a performance of the trained neural networks. For example, the performance evaluation module 234 may evaluate performance including, but not limited to, a number of false positives (e.g., of detection, segmentation, identification, etc.), a number of false negatives, misclassification, mean squared error (MSE), root mean squared error (RMSE), mean absolute error (MAE), processing time, memory requirements, processing requirements, cost, precision, recall, safety, detection speed, etc. In some instances, a performance metric can be based at least in part on a number of true negatives (e.g., negative instances that are predicted negative), true positives (e.g., positive instances that are predicted positive), false negatives (e.g., positive instances that are predicted negative), and/or false positives (e.g., negative instances that are predicted positive). In some instances, the performance evaluation module 234 may generate graphical representations of the performance metrics for display or presentation in any manner.

Additional details of the computer system(s) 216 are provided below in connection with FIG. 9.

Figure 3:
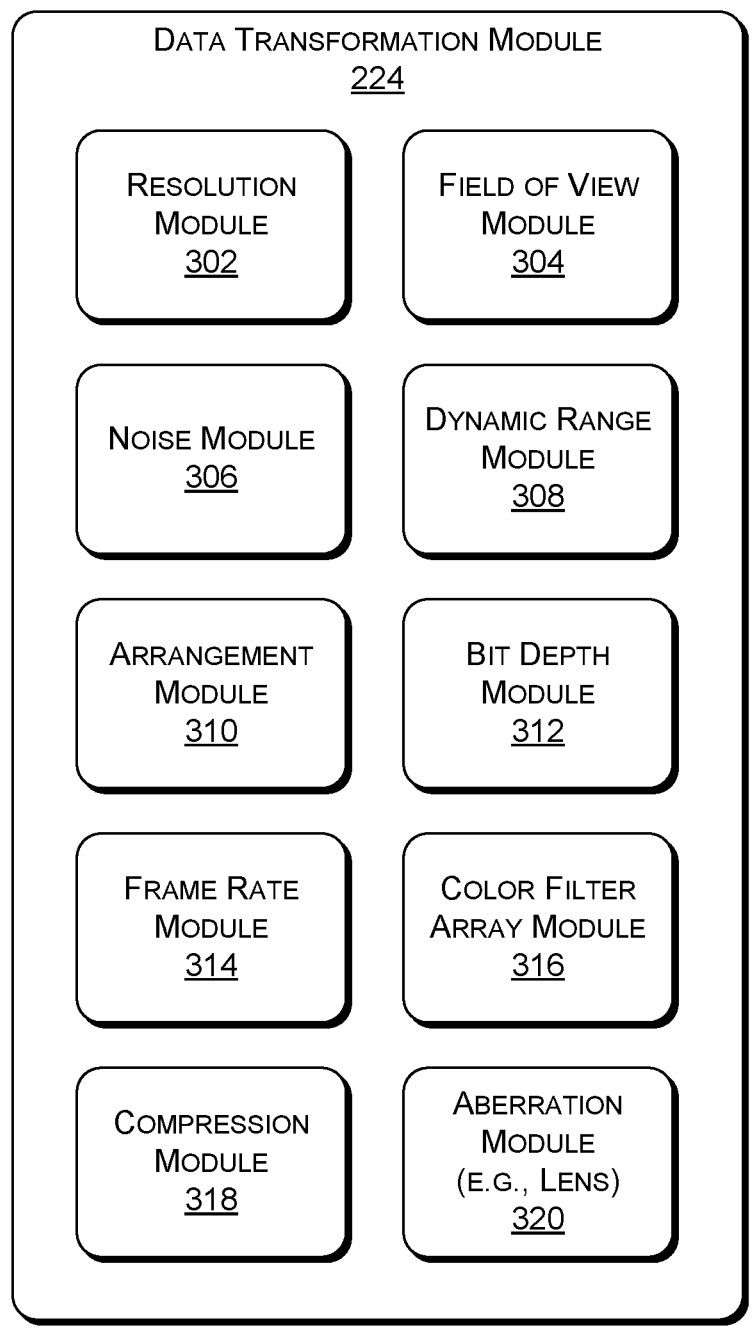
FIG. 3 illustrates an example architecture for a data transformation module for applying one or more transformations to real or synthetic data to generate modified datasets for use in network training, as described herein.

FIG. 3 illustrates an example architecture 300 of the data transformation module 224 for applying one or more transformations to real or synthetic data to generate modified datasets for use in network training, as described herein. For example, the data transformation module 224 may include various modules, including but not limited to a resolution module 302, a field of view module 304, a noise module 306, a dynamic range module 308, an arrangement module 310, a bit depth module 312, a frame rate module 314, a color filter array module 316, a compression module 318, and an aberration module 320.

The resolution module 302 may include functionality to modify a resolution of a dataset. For example, the resolution module 302 may downsample one or more images of a dataset to reduce a resolution of the dataset to one or more lower resolutions. An example is given above in connection with FIG. 1. For example, the dataset 106 may include a plurality of images, with each image including 100 megapixels of data. The resolution module 302 may downsample, combine data, discard data, etc. to reduce a resolution of each image from 100 megapixels to 20 megapixels, 15 megapixels, 10 megapixels, etc. It may be understood in the context of this disclosure that any resolution of data may be selected, including the resolution of the input dataset. In the context of a LIDAR sensor, the resolution module 302 may reduce a number of LIDAR points from a first resolution to a second, lower resolution of data. In terms of audio data, a reduction of resolution may include reducing a number of samples per second. Example algorithms utilized by the resolution module may include, but are not limited to, nearest-neighbor interpolation, bilinear and bicubic algorithms, sinc and Lanczos resampling, box sampling, mipmap, Fourier transform methods, edge-directed interpolation, etc.

The field of view module 304 may include functionality to transform a field of view of a dataset. For example, the field of view module 304 may reduce a horizontal and/or a vertical field of view by cropping at least a portion of a dataset.

The noise module 306 may include functionality to add noise to a dataset. For example, the noise module 306 may add Gaussian noise, salt-and-pepper noise, shot noise, quantization noise, anisotropic noise, etc. to some or all images in a dataset. In some instances, the noise module 306 may add a same type of noise to different datasets, while varying a level of noise for each dataset.

The dynamic range module 308 may include functionality to transform a dynamic range of a dataset. For example, the dynamic range module 308 may transform a ratio between a darkest value and a lightest value that may be represented in the dataset. In some instances, the dynamic range module 308 may determine a brightness range for values in a dataset, and may remove values that are above or below a brightest value or darkest value associated with the dynamic range.

The arrangement module 310 may include functionality to transform a mounting location or mounting direction of one or more sensors. In terms of synthetic data, the arrangement module 310 may simulate a change in mounting location. In terms of real data, the arrangement module may provide indications to alter one or more installation dimensions, such as position on a vehicle, height, angle of orientation, etc. Additional details with respect to arrangement are described below in connection with FIGS. 4A and 4B.

The bit depth module 312 may include functionality to modify a bit depth of images in a dataset. For example, an initial dataset (e.g., the dataset 106) may have a bit depth of 16 bits, which may correspond to 65,532 tones (e.g., colors) per channel per pixel. In some instances, the bit depth module 312 may reduce a bit depth of images in a dataset to 14 bits, 12 bits, 10 bits, 8 bits, etc. In some instances, the bit depth module 312 may reduce a bit depth of a dataset to any bit depth lower than the bit depth of the original dataset. In some instances, changing a bit depth of a dataset may correspond to changing a color depth of the image. In some instances, the bit depth module 312 may vary a number of bits for each channel of a color. That is, a bit depth of a first color (e.g., red) may be varied independently of a bit depth of a second color (e.g., blue).

The frame rate module 314 may include functionality to reduce a frame rate of a dataset. For example, if a dataset includes data at a first frame rate (e.g., 60 frames per second (FPS)), the frame rate module 314 may reduce a frame rate to a second, lower frame rate (e.g., 40 FPS, 30 FPS, 20 FPS, etc.).

The color filter array module 316 may include functionality to simulate various color filter arrays associated with a sensor that captured a dataset. For example, if a dataset (e.g., the dataset 106) was captured using a sensor associated with a Bayer color filter array, the color filter array module 316 may transform the data to correspond to data obtained using a different color filter array, such as a RGBE filter. In some instances, the color filter array module 316 may transform datasets to simulate a monochrome color filter array. In some instances, the color filter array module 316 may function to attenuate signal responses to light above or below a particular wavelength (or frequency). For example, a dataset (e.g., the dataset 106) may include data outside range of visible light (e.g., 390 nm (nanometers) to 700 nm), while color filter array module 316 may discard data corresponding to frequencies outside or inside the visible light range (e.g., to generate a modified dataset such as the modified dataset 112). It may be understood that if a sensor dataset includes data corresponding to wavelengths of light (or signals) from a first frequency to a second frequency (e.g., ranging from infrared to ultraviolet) the color filter array module 316 may generate any number of datasets corresponding to any range of wavelengths included in the dataset.

The compression module 318 may include functionality to apply various compression levels and/or algorithms to datasets of sensor data to simulate post-processing of data. In some instances, the compression module 318 may apply lossless or lossy compression to one or more datasets. In some instances, the compression module 318 may vary a type of file of data associated with datasets in conjunction with varying a compression of the data. For example, an initial dataset (e.g., the dataset 106) may be an uncompressed data set (e.g., RAW images), while the compression module 318 may convert the dataset to a JPEG format at varying levels of compression.

The aberration module 320 may include functionality to transform datasets (e.g., the dataset 106) to simulate or recreate various lens aberrations that may be associated with a camera lens, for example. In some instances, the aberration module 320 may include functionality to add one or more aberrations including, but not limited to spherical aberrations, coma, astigmatism, curvature of field, distortion, chromatic aberration, etc. Additionally, or in the alternative, such an aberration module 320 may include functionality to transform datasets to simulate or recreate various camera models (e.g., pinhole models, fish-eye models, etc.).

Further transformations may include modifying datasets to simulate weather (e.g., rain, snow, dust, etc.), time of day (e.g., morning, sunny, dusk, dark, etc.), location of sun (including adding and/or removing shadows), etc. As may be understood in the context of this disclosure, the data transformation module 224 may vary any number of features at a time, and may generate any number of modified datasets.

Figure 4A:
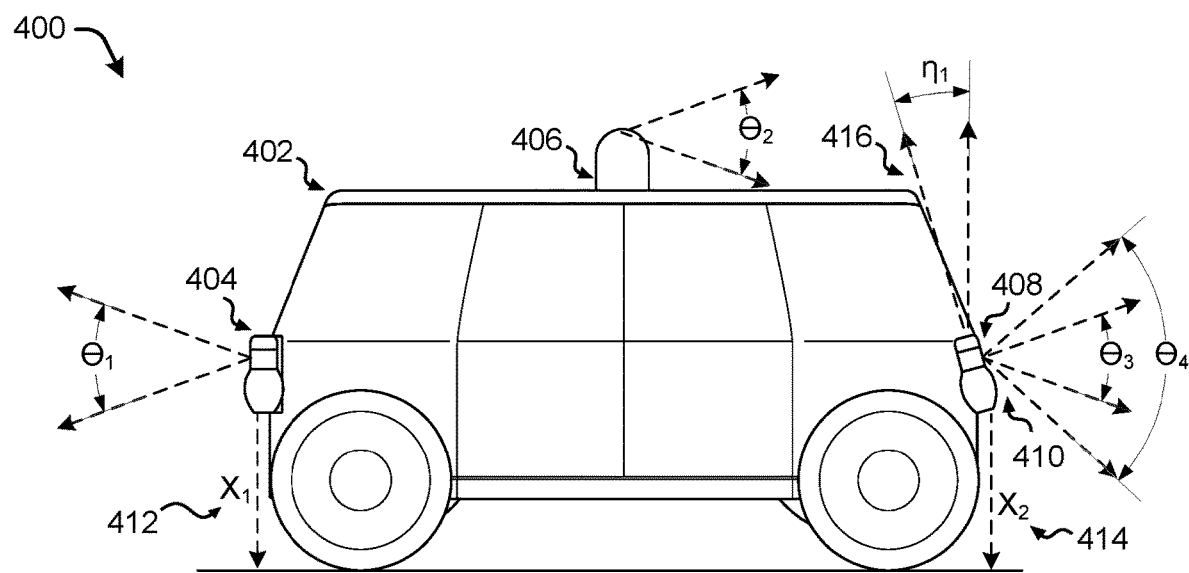
FIG. 4A depicts a side view of an example vehicle having multiple sensor assemblies mounted to the vehicle.

FIG. 4A depicts a side view 400 of an example vehicle 402 having multiple sensor assemblies mounted to the vehicle. In some instances, the data transformation module 224 can simulate changes to extrinsic characteristics of a sensor mounted to the vehicle, and in some instances, a mounting location or orientation of a sensor can be changed, with a dataset captured before and after the change to evaluate the effect of change on system performance.

As shown in the side view 400, the vehicle 402 may include any number of sensors in any combination or configuration. For example, the vehicle 402 includes at least sensors 404, 406, 408, and 410. In some instances, the sensor 404 may comprise a Radar sensor mounted at a height 412 $X_1$ above the ground having a vertical field of view illustrated as $\theta_1$. The sensor 406 may include a LIDAR sensor mounted on a roof of the vehicle, the sensor 406 having a vertical field of view illustrated as $\theta_2$. In some instances, the sensors 408 and 410 may be mounted at substantially a same location on the vehicle 402, with the sensor 408 having a vertical field of view $\theta_3$, and with the sensor 410 having a vertical field of view $\theta_4$. In some instances, the sensor 408 represents an RGB (e.g., red, green, blue) camera and the sensor 410 may represent a LIDAR sensor. The sensors 408 and 410 may be mounted on the vehicle 402 at a height 414 $X_2$ above the ground, with a canting of an axis 416 of the sensors 408 and 410 at an angle $\eta_1$.

Figure 4B:
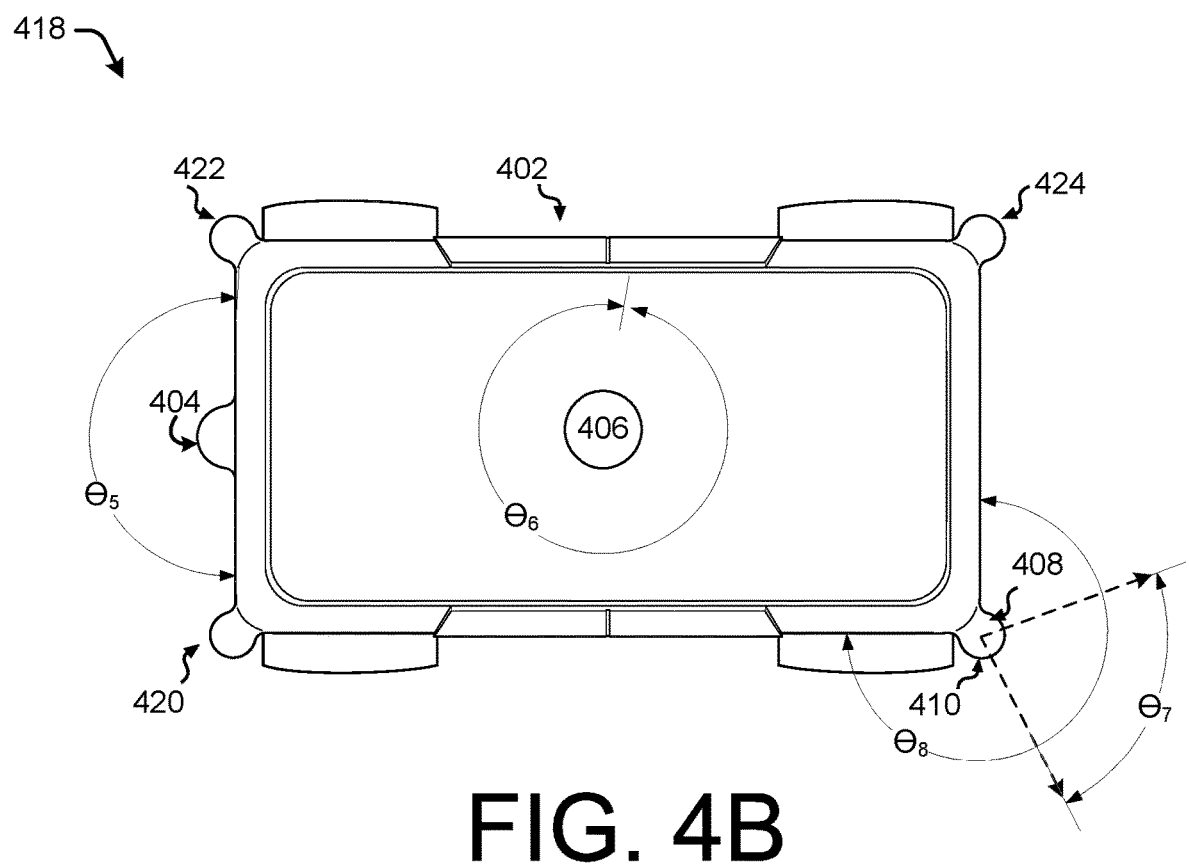
FIG. 4B depicts a top plan view of an example vehicle having multiple sensor assemblies mounted to the vehicle.

FIG. 4B depicts a top plan view 418 of the example vehicle 402 having multiple sensor assemblies mounted to the vehicle. For example, the sensors 404, 406, 408, and 410 can be seen in FIG. 4B, as well as additional sensors 420, 422, and 424. As may be understood in the context of this disclosure, the vehicle 402 may include any number and any type of sensors. As illustrated in FIG. 4B, the sensor 404 may include a horizontal field of view $\theta_5$, the sensor 406 may include a horizontal field of view $\theta_6$, the sensor 408 may include a horizontal field of view $\theta_7$, and the sensor 410 may include a horizontal field of view $\theta_8$. As may be understood in the context of this disclosure, the mounting locations and fields of view may correspond to extrinsic characteristics and intrinsic characteristics, respectfully, which may be varied, tested, and evaluated as described herein.

FIGS. 1 and 5-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
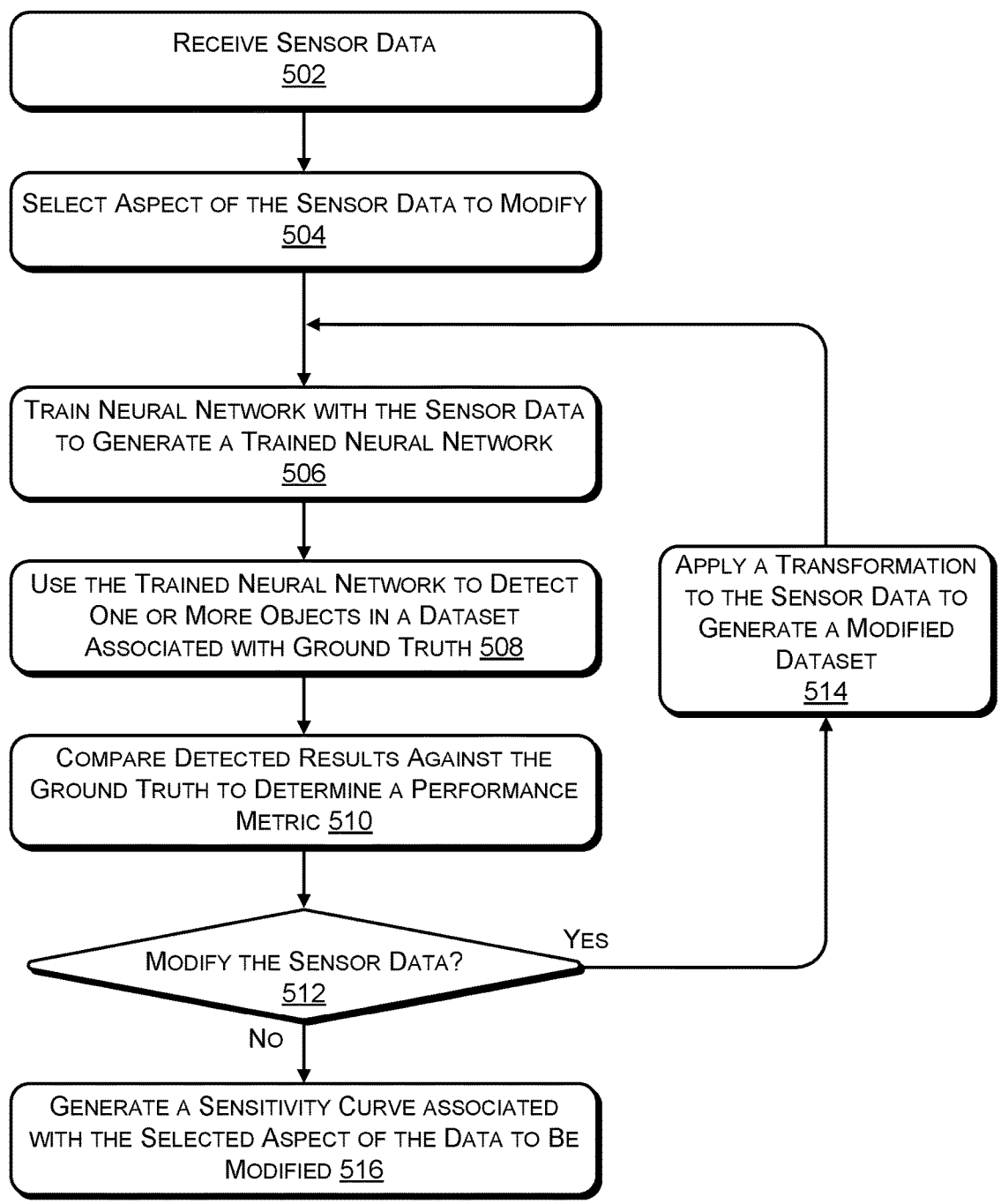
FIG. 5 depicts a process for evaluating a performance of neural networks trained with modifications to datasets corresponding to hardware modifications of sensors.

FIG. 5 depicts a process for evaluating performance of modifications to datasets corresponding to hardware modifications of sensors. For example, some or all of the process 500 can be performed by one or more components in the architectures 200 and 300, or in the computing system 900, as described below.

At operation 502, the process may include receiving sensor data. For example, the operation 502 may include receiving real sensor data and/or synthetic sensor data. In some instances, the sensor data may include annotations identifying objects within the data. As may be understood in the context of this disclosure, the sensor data may include one or more datasets from any sensors described herein.

At operation 504, the process may include selecting at least one aspect of the sensor data to modify. For example, as discussed herein, the at least one aspect of the sensor data to modify may include, but is not limited to, resolution, field of view (e.g., horizontal and/or vertical field of view), noise (e.g., Gaussian noise, salt-and-pepper noise, shot noise, quantization noise, anisotropic noise, etc.), dynamic range, arrangement (e.g., location on a vehicle), bit depth, frame rate, color filter array (e.g., Bayer filter, RGBE filter, CYYM filter, RGBW Bayer, monochrome, etc.), compression, aberration (e.g., lens aberration), weather (e.g., rain, snow, sleet, hail, night, day, etc.), etc. In some examples, such a modification may include a null modification. In other words, such a modification may leave sensor data obtained in 502 unchanged.

At operation 506, the process may include training a neural network with the sensor data to generate a trained neural network. In some instances, the neural network to be trained may include an untrained neural network, such that weights, parameters, etc. have not yet been defined.

At operation 508, the process may include using the trained neural network to detect one or more objects is a dataset associated with a ground truth. For example, the operation 508 may include inputting an evaluation dataset into the trained neural network to evaluate a performance of the trained neural network. In some examples, such an evaluation dataset may comprise a subset of the sensor data obtained in 502 which has not been used to train the neural network. That is, the evaluation dataset may be unique with respect to the sensor data used to train the neural network. In some instances, the operation 508 may include identifying objects in the evaluation dataset, according to the one or more functions of the trained neural network.

At operation 510, the process may include comparing detected results against the ground truth to determine a performance metric. For example, the operation 510 can include determining a number of false positives (e.g., of detection, segmentation, identification, etc.), a number of false negatives, misclassification, mean squared error (MSE), root mean squared error (RMSE), mean absolute error (MAE), processing time, memory requirements, processing requirements, cost, precision, recall, safety, detection speed, etc. In some instance, a performance metric can be based at least in part on a number of true negatives (e.g., negative instances that are predicted negative), true positives (e.g., positive instances that are predicted positive), false negatives (e.g., positive instances that are predicted negative), and/or false positives (e.g., negative instances that are predicted positive).

At operation 512, the process may include determining whether to modify the sensor data. For example, the operation 512 may include determining whether a performance metric is below a performance threshold, or determining that a number of evaluation iterations is below a threshold. If the sensor data is to be modified (e.g., "yes" in the operation 512), the process continues to operation 514.

At operation 514, the process may include applying a transformation to the sensor data to generate a modified dataset. For example, if an aspect of the sensor data to be modified is a resolution of the sensor data, the operation 514 may include modifying a resolution of the sensor data to generate a dataset with a resolution that is different from the original sensor data. Following a transformation of the sensor data in the operation 514, the process 500 may continue to the operations 506, 508, and 510 whereby a new, untrained neural network may be trained using the modified dataset, the trained neural network can be used to detect objects in an evaluation dataset, and a performance metric of the particular neural network can be determined.

At the operation 512, if the sensor data is not to be modified (e.g., "no" in the operation 512), the process continues to operation 516.

At operation 516, the process may include generating a sensitivity curve associated with the selected aspect of the data to be modified. For example, a sensitivity cure is shown in the example 136 of FIG. 1. In some instances, the sensitivity curve may include determining a performance metric threshold associated with a minimum performance level or associated with a minimum hardware definition. In some instances, the sensitivity curve and/or performance metric can be used in selecting one or more hardware sensors for inclusion in a sensor suite of an autonomous vehicle.

Figure 6:
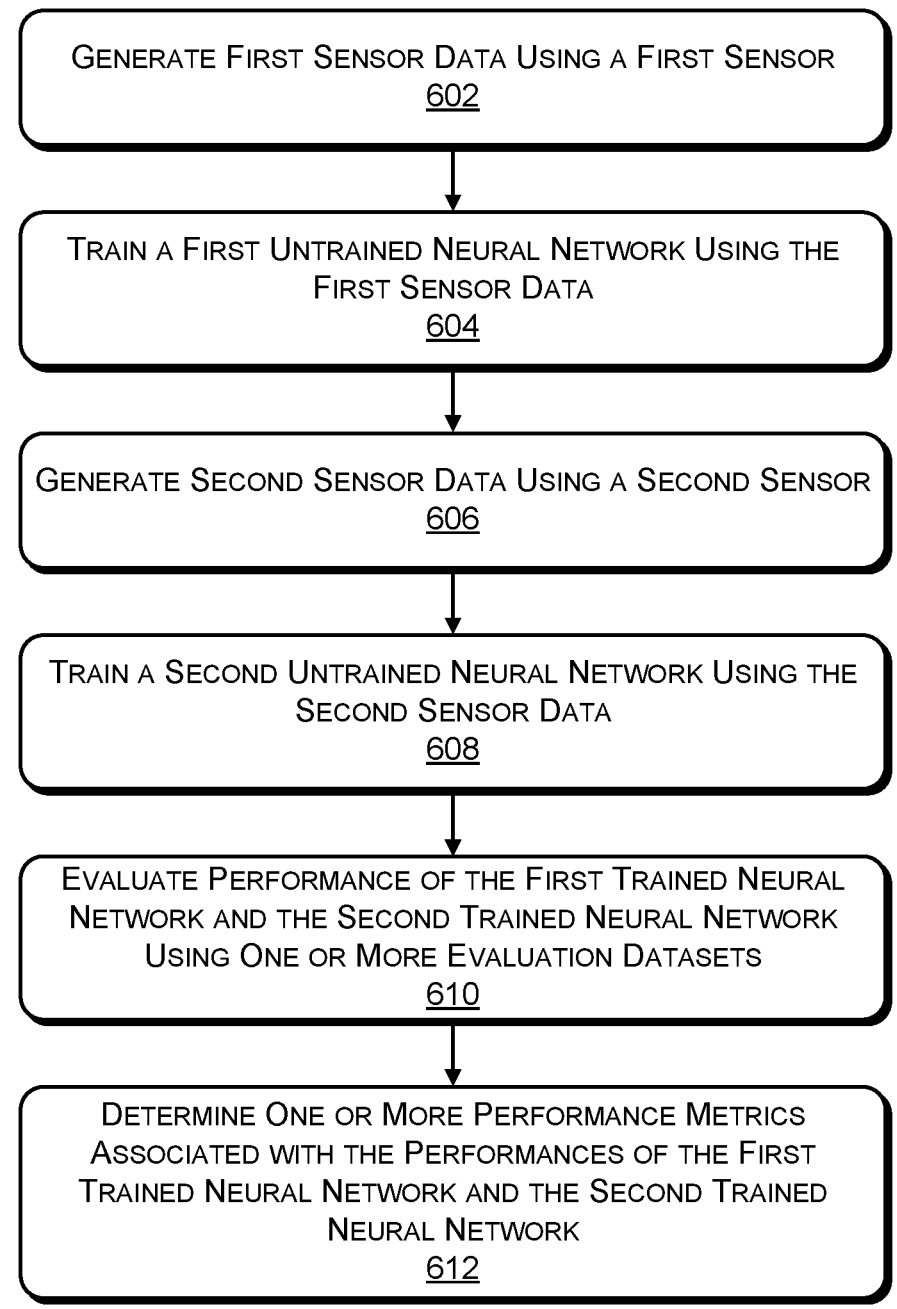
FIG. 6 depicts a process for evaluating a performance of various sensors by training neural networks using data captured via the various sensors and evaluating detection using the trained neural networks.

FIG. 6 depicts a process for evaluating performance of various sensors by training neural networks using data captured via the various sensors and evaluating detection using the trained neural networks. For example, some or all of the process 600 can be performed by one or more components in the architectures 200 and 300, or in the computing system 900, as described below.

At operation 602, the process may include generating first sensor data using a first sensor. In some instances, the operation 602 may include generating an image dataset and annotating the dataset with a ground truth.

At operation 604, the process may include training a first untrained neural network using the first sensor data. For example, the operation 604 can include training the neural network to perform some operation, such as identifying objects, segmenting image data, identifying free space or obstructed space, etc. In some instances, the operation 604 can include reserving at least a portion of the second sensor data from the training, for subsequent use as an evaluation dataset, for example.

At operation 606, the process may include generating second sensor data using a second sensor. In some instances, the second sensor is a same type of sensor as the first sensor, but may have slightly different intrinsic characteristics or extrinsic characteristics. For example, the first sensor may be a first camera with a first resolution, and the second sensor may be a second camera with a second resolution. In some instances, the first sensor may be a first RGB camera, while the second sensor may be a monochrome camera. In some instances, the first sensor may be a first Radar sensor, and while the second sensor may be a second Radar sensor having different characteristics. It may be understood in the context of this disclosure that the aforementioned examples of sensors are exemplary and other sensors and/or sensor types may be used. For example, in some instances, the first sensor data may represent real data, while the second sensor data may represent synthetic data. In some instances, the operation 606 may include generating an image dataset and annotating the dataset with a ground truth.

At operation 608, the process may include training a second untrained neural network using the second sensor data. For example, the operation 608 can include training the neural network to perform some operation, such as identifying objects, segmenting image data, identifying free space or obstructed space, etc. In some instances, the operation 608 can include reserving at least a portion of the second sensor data from the training, for subsequent use as an evaluation dataset, for example.

At operation 610, the process may include evaluating a performance of the first trained neural network and the second trained neural network using one or more evaluation datasets. In some examples, the one or more evaluation datasets may include at least a portion of the first sensor data and/or at least a portion of the second sensor data generated using the first sensor and the second sensor, respectively.

At operation 612, the process may include determining one or more performance metrics associated with the performances of the first trained neural network and the second trained neural network. Aspects of determining and evaluating a performance of the neural networks have been described herein.

Figure 7:
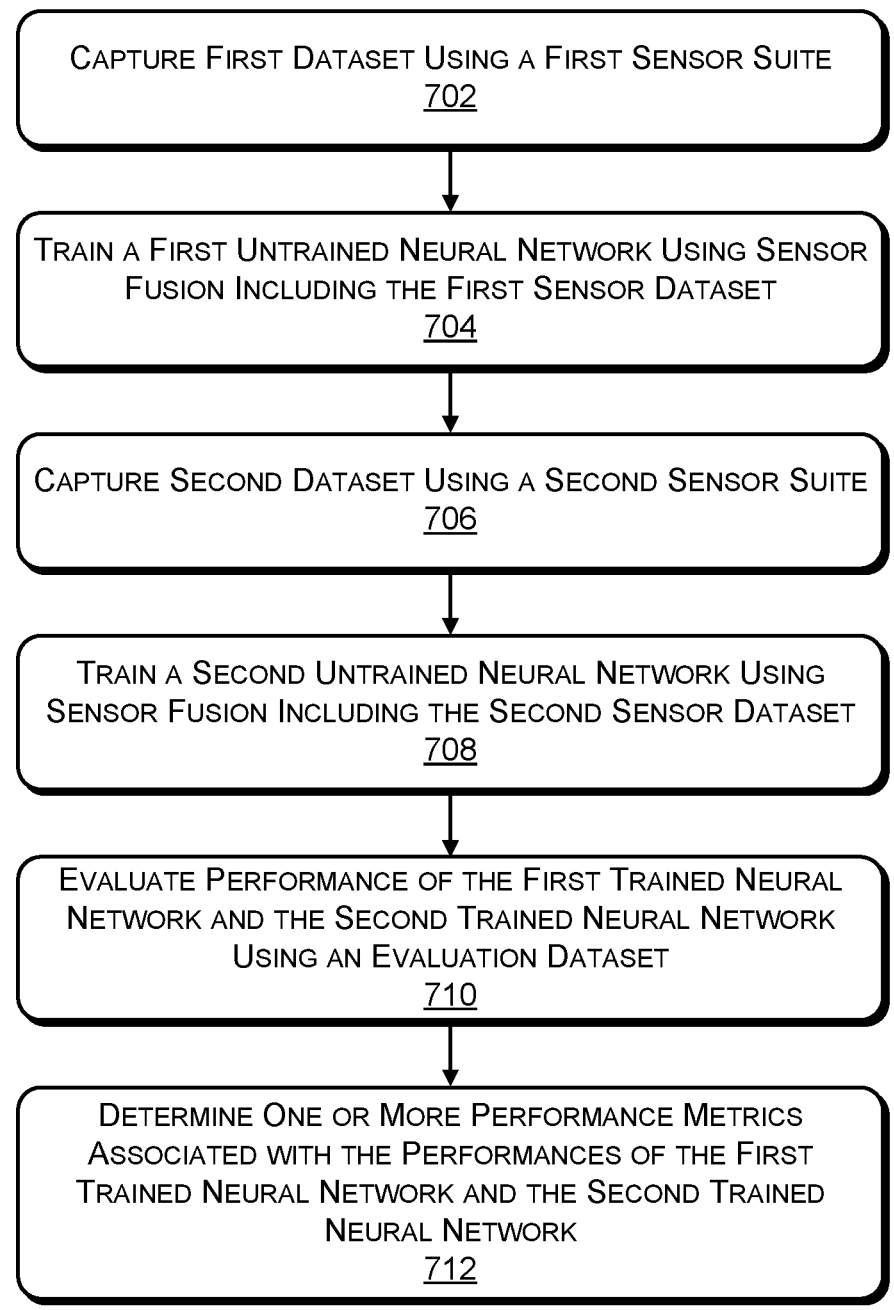
FIG. 7 depicts a process for evaluating a performance of various sensor suites by training neural networks using data captured via the various sensor suites and evaluating detection using the trained neural networks.

FIG. 7 depicts a process for evaluating performance of various sensor suites by training neural networks using data captured via the various sensor suites and evaluating detection using the trained neural networks. For example, some or all of the process 700 can be performed by one or more components in the architectures 200 and 300, or in the computing system 900, as described below.

At operation 702, the process may include capturing a first dataset using a first sensor suite. In some instances, a sensor suite may include data corresponding to at least two sensors, such as a camera and a LIDAR sensor. The first dataset may include any number of channels corresponding to various sensor data. In some instances, the first dataset may include real data captured using a hardware sensor, the first dataset may include real data that has been modified using a transformation described herein, the first dataset may include synthetic data generated using a simulator, and in some instances, the first dataset may include any combination of real data, modified data, and/or synthetic data. In some instances, the operation 702 may include annotating at least a portion of the first dataset with a ground truth.

At operation 704, the process may include training a first untrained neural network using sensor fusion including the first dataset. For example, the operation 704 may include combining data from various sensors into a single dataset or representation of data, and training the untrained neural network to recognize objects or perform an action using the fused dataset.

At operation 706, the process may include capturing a second dataset using a second sensor suite. In some instances, the second sensor suite may include different sensors from the first sensor suite, and in some instances, the second sensor suite may include sensors having substantially similar intrinsic characteristics but having at least one different extrinsic characteristic. As discussed herein, the operation 706 may include annotating at least a portion of the second dataset with a ground truth.

At operation 708, the process may include first performing sensor fusion on the second dataset to create fused dataset and training an untrained neural network using the fused dataset. For example, the operation 708 may include combining data from various sensors into a single dataset or representation of data, and training the untrained neural network to recognize objects or perform an action using the fused dataset.

At operation 710, the process may include evaluating performances of the first trained neural network and the second trained neural network using an evaluation dataset. In some examples, the one or more evaluation datasets may include at least a portion of the first dataset and/or at least a portion of the second dataset generated using the first sensor suite and the second sensor suite, respectively. In some examples, such portions may not have been used to train the neural network.

At operation 712, the process may include determining one or more performance metrics associated with the performance of the first trained neural network and the second trained neural network. Aspects of determining and evaluating a performance of the neural networks have been described herein.

Figure 8:
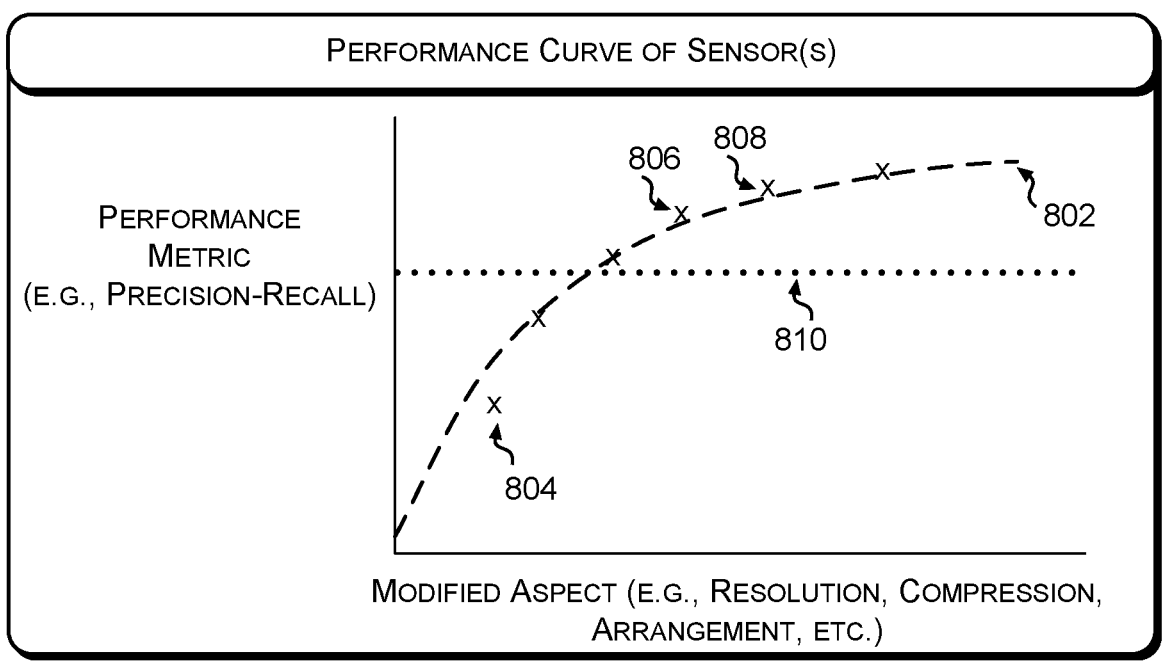
FIG. 8 is a graphic representation of a performance curve for evaluating one or more sensors in an autonomous vehicle, for example.

FIG. 8 is a graphic representation 800 of a performance curve for evaluating one or more sensors in an autonomous vehicle, for example. In some instances, the graphic representation 800 may include a performance curve 802 associated with various performance metrics 804, 806, and 808 representing a performance metric associated with an evaluation of a trained neural network, as described herein. In some instances, the graphic representation 800 may include a performance metric threshold 810 that may be selected to represent a minimum performance threshold for an operation of a neural network. In some instances, any type of performance metric may be represented in the graphic representation 800, as discussed herein.

Figure 9:
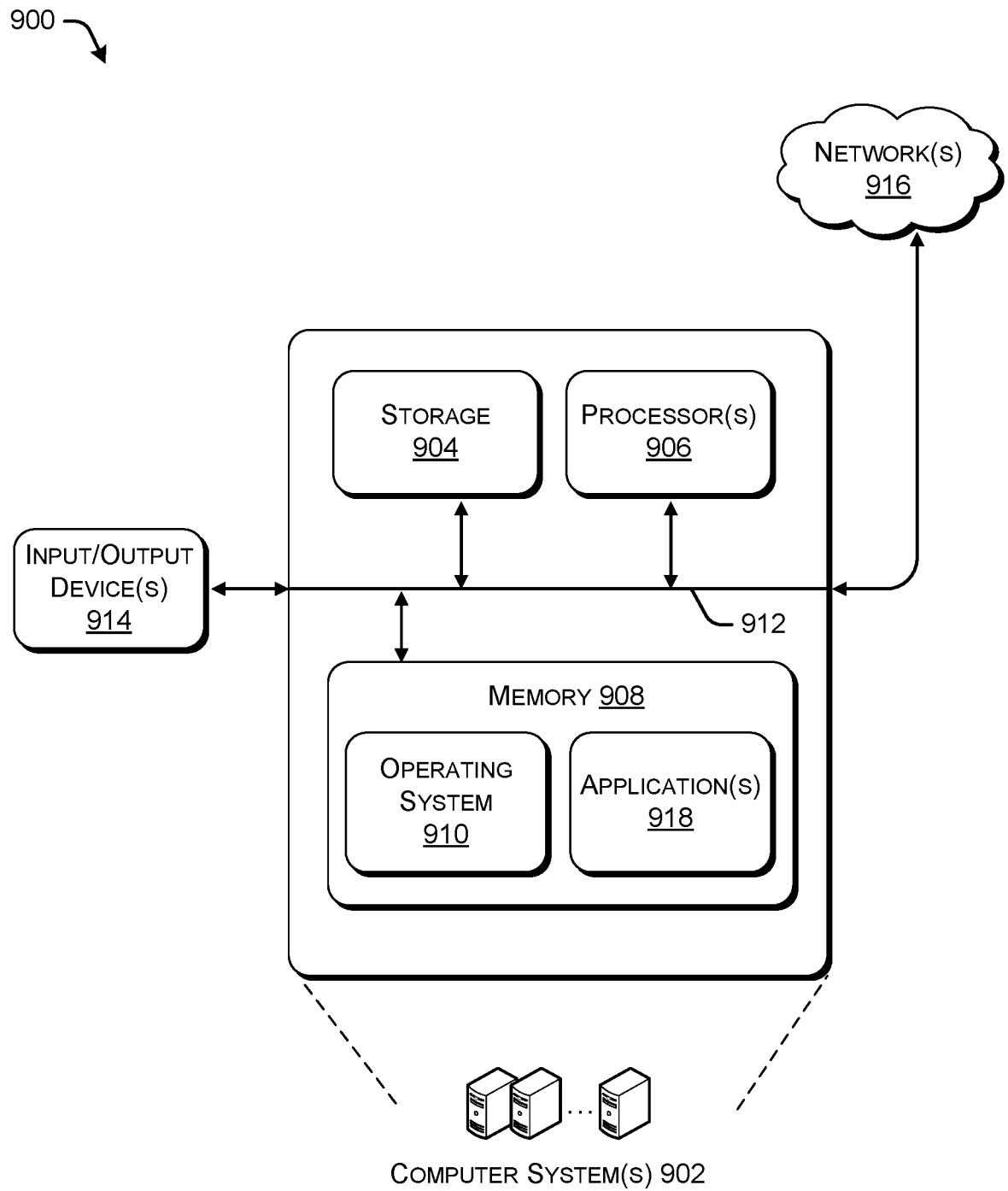
FIG. 9 depicts an example block diagram for a computer system implementing the techniques described herein.

FIG. 9 illustrates a computing system 900 as an example computerized system on which the disclosures may be implemented in whole or in part. The computing system 900 depicts one or more computer systems 902 that comprise a storage 904, one or more processor(s) 906, a memory 908, and an operating system 910. The storage 904, the processor(s) 906, the memory 908, and the operating system 910 may be communicatively coupled over a communication infrastructure 912. Optionally, the computer system 902 may interact with a user, or environment, via input/output (I/O) device(s) 914, as well as one or more other computing devices over a network 916, via the communication infrastructure 912. The operating system 910 may interact with other components to control one or more applications 918.

In some instances, the computer system(s) 902 may correspond to the computer system(s) 216 of FIG. 2. Further, the computer system(s) 902 may implement any hardware and/or software to implement the modules 220, 222, 224, 226, 228, 230, 232, and 234 to perform the network training and evaluation as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary computerized system for implementing the systems and methods described herein is illustrated in FIG. 9. A processor or computer system can be configured to particularly perform some or all of the methods described herein. In some embodiments, the methods can be partially or fully automated by one or more computers or processors. The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™ iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have predefined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C #, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. An example system comprises:
one or more processors; and
one or more computer readable storage media communicatively coupled to the one or more processors and storing instructions that are executable by the one or more processors to:
capture a first dataset representing data from a first sensor at a first resolution;
select resolution of the first dataset as an aspect of the first dataset to modify;
generate a first modified dataset based at least in part on the first dataset, the first modified dataset representing a second resolution lower than the first resolution of the first dataset;
generate a second modified dataset based at least in part on the first dataset, the second modified dataset representing a third resolution, the third resolution different from the first resolution and the second resolution;
train a first untrained neural network using at least a portion of the first modified dataset to generate a first trained neural network;
train a second untrained neural network using at least a portion of the second modified dataset to generate a second trained neural network;
evaluate a performance of the first trained neural network based at least in part on processing a first evaluation dataset using the first trained neural network;
evaluate a performance of the second trained neural network based at least in part on processing a second evaluation dataset using the second trained neural network;
determine a performance metric of the first trained neural network; and
determine a performance metric of the second trained neural network.

B. The system of example A, wherein the instructions are further executable by the one or more processors to:
determine that at least the performance metric of the first trained neural network is above a performance metric threshold; and
select a sensor for inclusion in an autonomous vehicle based at least in part on the performance metric of the first trained neural network being above the performance threshold.

C. The system of example A or example B, wherein the first untrained neural network is trained using at least a first portion of the first modified dataset and the first evaluation dataset includes at least a second portion of the first modified dataset,
and wherein the second untrained neural network is trained using at least a first portion of the second modified dataset and the second evaluation dataset includes at least a second portion of the second modified dataset.

D. The system of example C, wherein:
the first portion of the first modified dataset is unique with respect to the second portion of the first modified dataset; and
the first portion of the second modified dataset is unique with respect to the second portion of the second modified dataset.

E. The system of any one of example A through example C, wherein the instructions are further executable by the one or more processors to:
determine at least one of i) a number of positively identified objects identified by the first trained neural network, or ii) a number of missed identifications of objects not identified by the first trained neural network; and
wherein the performance metric of the first trained neural network is based at least in part on the number of positively identified objects or the number of missed identifications of objects.

F. The system of any one of example A through example C, wherein the first sensor is one of a camera, a LIDAR sensor, a Radar sensor, or an ultrasonic sensor.

G. The system of any one of example A through example C, wherein the instructions are further executable by the one or more processors to:
annotate the first dataset with first annotations to identify objects represented in the first data set, the first annotations represented at the first resolution;
modify the first annotations to generate second annotations, the second annotations to identify the objects represented in the first modified dataset, the second annotations represented at the second resolution.

H. An example method comprises:
receiving a first dataset;
receiving a second dataset different than the first dataset;
training a first untrained neural network using at least a portion of the first dataset to generate a first trained neural network;
training a second untrained neural network using at least a portion of the second dataset to generate a second trained neural network;
evaluating a performance of the first trained neural network;

evaluating a performance of the second trained neural network; and determining a performance curve based at least in part on the performance of the first trained neural network and the performance of the second trained neural network.

I. The method of example H, further comprising:
capturing the first dataset using a first hardware sensor;
selecting an aspect of the first dataset to transform; and
transforming the first dataset to generate the second dataset based at least in part on the aspect of the first dataset to transform.

J. The method of example H or example I, wherein the aspect of the first dataset to transform includes at least one of resolution, field of view, noise, dynamic range, arrangement, bit depth, frame rate, color filter array, compression, or aberration.

K. The method of any one of example H through example J, wherein the first dataset includes camera data and LIDAR data, and wherein the second dataset includes camera data and LIDAR data.

L. The method of any one of example H through example J, wherein at least a portion of the first dataset or the second dataset represents simulated data generated using a simulator.

M. The method of any one of example H through example J, wherein the at least the portion of the first dataset is a first portion and the at least the portion of the second dataset is a second portion, the method further comprising:
evaluating the first performance of the first trained neural network using a third portion of the first dataset; and
evaluating the second performance of the second trained neural network using a fourth portion of the second dataset.

N. The method of example M, wherein:
the first portion is unique with respect to the third portion of the first dataset; and
the second portion is unique with respect to the fourth portion of the second dataset.

O. The method of any one of example H through example J, further comprising selecting at least one sensor for inclusion in a sensor suite associated with an autonomous vehicle, the at least one sensor having one or more intrinsic characteristics or one or more extrinsic characteristics based at least in part on the performance curve.

P. The method of any one of example H through example J, further comprising selecting one or more sensors, the one or more sensors having one or more intrinsic characteristics or one or more extrinsic characteristic selected based at least in part on the performance curve, the one or more sensors for an autonomous vehicle that maximizes performance for a given cost constraint.

Q. An exemplary system comprises:
one or more processors; and
one or more computer readable storage media communicatively coupled to the one or more processors and storing instructions that are executable by the one or more processors to:
receive a first dataset;
receive a second dataset different than the first dataset;
train a first untrained neural network using the first dataset to generate a first trained network;
train a second untrained neural network using the second dataset to generate a second trained network;
evaluate a performance of the first trained network;
evaluate a performance of the second trained network; and determine a performance curve based at least in part on the performance of the first trained network and the performance of the second trained network.

R. The system of example Q, wherein the instructions are further executable by the one or more processors to:
capture the first dataset using a first hardware sensor;
select an aspect of the first dataset to transform; and
transform the first dataset into the second dataset based at least in part on the aspect of the first dataset to transform.

S. The system of example Q or example R, wherein the aspect of the first dataset to transform includes at least one of resolution, field of view, noise, dynamic range, arrangement, bit depth, frame rate, color filter array, compression, or aberration.

T. The system of any one of example Q through example S, wherein:
the first dataset includes at least two data types selected from a group consisting of: camera data, LIDAR data, Radar data, and ultrasonic data; and
wherein the instructions are further executable by the one or more processors to fuse the at least two data types to generate the first dataset.

U. The system of any one of example Q through example S, wherein at least a portion of the first dataset or the second dataset represents simulated data generated using a simulator.

V. The system of any one of example Q through example S, wherein the instructions are further executable by the one or more processors to select at least one sensor for inclusion in an autonomous vehicle, the at least one sensor having at least one or more intrinsic characteristics or one or more extrinsic characteristics based at least in part on the performance curve.

What is claimed is:

1. A system comprising:
one or more processors; and
one or more computer readable storage media communicatively coupled to the one or more processors and storing instructions that are executable by the one or more processors to:
receive a first dataset representing data from a first sensor at a first resolution;
determine resolution of the first dataset as an aspect of the first dataset to modify;
generate a first modified dataset based at least in part on the first dataset, the first modified dataset representing a second resolution lower than the first resolution of the first dataset;
generate a second modified dataset based at least in part on the first dataset, the second modified dataset representing a third resolution, the third resolution different from the first resolution and the second resolution;
train a first untrained neural network using at least a portion of the first modified dataset to generate a first trained neural network;
train a second untrained neural network using at least a portion of the second modified dataset to generate a second trained neural network, wherein the second untrained neural network differs from the first trained neural network;
evaluate a performance of the first trained neural network based at least in part on processing a first evaluation dataset using the first trained neural network;
evaluate a performance of the second trained neural network based at least in part on processing a second evaluation dataset using the second trained neural network, wherein the second evaluation dataset is associated with the first evaluation dataset;
determine a first performance metric of the first trained neural network;
determine a second performance metric of the second trained neural network; and
determine, based at least in part on at least one of the first performance metric or the second performance metric, a specification for a sensor for inclusion in an autonomous vehicle.

2. The system of claim 1, wherein the instructions are further executable by the one or more processors to:
determine that at least the first performance metric of the first trained neural network is above a performance metric threshold; and
determine the sensor for inclusion in the autonomous vehicle based at least in part on the first performance metric of the first trained neural network being above the performance metric threshold.

3. The system of claim 1, wherein the first untrained neural network is trained using at least a first portion of the first modified dataset and the first evaluation dataset includes at least a second portion of the first modified dataset,
and wherein the second untrained neural network is trained using at least a first portion of the second modified dataset and the second evaluation dataset includes at least a second portion of the second modified dataset.

4. The system of claim 3, wherein:
the first portion of the first modified dataset is unique with respect to the second portion of the first modified dataset; and
the first portion of the second modified dataset is unique with respect to the second portion of the second modified dataset.

5. The system of claim 1, wherein the instructions are further executable by the one or more processors to:
determine at least one of i) a number of positively identified objects identified by the first trained neural network, or ii) a number of missed identifications of objects not identified by the first trained neural network; and
wherein the first performance metric of the first trained neural network is based at least in part on the number of positively identified objects or the number of missed identifications of objects.

6. The system of claim 1, wherein the first sensor is one of a camera, a LIDAR sensor, a Radar sensor, or an ultrasonic sensor.

7. The system of claim 1, wherein the instructions are further executable by the one or more processors to:
annotate the first dataset with first annotations to identify objects represented in the first dataset, the first annotations represented at the first resolution; and
modify the first annotations to generate second annotations, the second annotations to identify the objects represented in the first modified dataset, the second annotations represented at the second resolution.

8. A method comprising:
receiving a first dataset;
receiving a second dataset different than the first dataset;
training a first untrained neural network using at least a portion of the first dataset to generate a first trained neural network;
training a second untrained neural network using at least a portion of the second dataset to generate a second trained neural network;
evaluating a performance of the first trained neural network based at least in part on processing a first evaluation dataset using the first trained neural network;
evaluating a performance of the second trained neural network based at least in part on processing a second evaluation dataset using the second trained neural network, wherein the second evaluation dataset is associated with the first evaluation dataset;
determining a performance curve based at least in part on the performance of the first trained neural network and the performance of the second trained neural network; and
determining, based at least in part on the performance curve, a specification of a sensor for inclusion in an autonomous vehicle.

9. The method of claim 8, further comprising:
capturing the first dataset using a first hardware sensor;
determining an aspect of the first dataset to transform; and
transforming the first dataset to generate the second dataset based at least in part on the aspect of the first dataset to transform.

10. The method of claim 9, wherein the aspect of the first dataset to transform includes at least one of resolution, field of view, noise, dynamic range, arrangement, bit depth, frame rate, color filter array, compression, or aberration.

11. The method of claim 8, wherein the first dataset includes camera data and LIDAR data, and wherein the second dataset includes camera data and LIDAR data.

12. The method of claim 8, wherein at least a portion of the first dataset or the second dataset represents simulated data generated using a simulator.

13. The method of claim 8, wherein the at least the portion of the first dataset is a first portion and the at least the portion of the second dataset is a second portion, the method further comprising:
evaluating the performance of the first trained neural network using a third portion of the first dataset; and
evaluating the performance of the second trained neural network using a fourth portion of the second dataset.

14. The method of claim 8, further comprising determining one or more intrinsic characteristics or one or more extrinsic characteristics of the sensor based at least in part on the performance curve.

15. The method of claim 14, wherein the specification is associated with maximizing performance for a given cost constraint.

16. The method of claim 13, wherein:
the first untrained neural network and the second untrained neural networks are different neural networks associated with an untrained state.

17. A system comprising:
one or more processors; and
one or more computer readable storage media communicatively coupled to the one or more processors and storing instructions that are executable by the one or more processors to:
receive a first dataset;
receive a second dataset different than the first dataset;
train a first untrained neural network using the first dataset to generate a first trained network;
train a second untrained neural network using the second dataset to generate a second trained network;

evaluate a performance of the first trained network based at least in part on processing a first evaluation dataset using the first trained neural network;

evaluate a performance of the second trained network based at least in part on processing a second evaluation dataset using the second trained neural network, wherein the second evaluation dataset is associated with the first evaluation dataset;

determine a performance curve based at least in part on the performance of the first trained network and the performance of the second trained network; and determine, based at least in part on the performance curve, a specification of a sensor for inclusion in an autonomous vehicle.

18. The system of claim 17, wherein the instructions are further executable by the one or more processors to:

receive the first dataset captured using a first hardware sensor;

determine an aspect of the first dataset to transform; and transform the first dataset into the second dataset based at least in part on the aspect of the first dataset to transform.

19. The system of claim 18, wherein the aspect of the first dataset to transform includes at least one of resolution, field of view, noise, dynamic range, arrangement, bit depth, frame rate, color filter array, compression, or aberration.

20. The system of claim 17, wherein:

the first dataset includes at least two data types determined from a group consisting of: camera data, LIDAR data, Radar data, and ultrasonic data; and wherein the instructions are further executable by the one or more processors to fuse the at least two data types to generate the first dataset.

21. The system of claim 17, wherein at least a portion of the first dataset or the second dataset represents simulated data generated using a simulator.

22. The system of claim 17, wherein the instructions are further executable by the one or more processors to determine the sensor for inclusion in the autonomous vehicle, the sensor having at least one or more intrinsic characteristics or one or more extrinsic characteristics based at least in part on the performance curve.

* * * * *